UNITED STATES PATENT OFFICE.

JOHN SEE, OF PHILADELPHIA, PENNSYLVANIA.

Letters Patent No. 78,544, dated June 2, 1868.

---

IMPROVED COMPOSITION FOR COVERING ROOFS, PAVEMENTS, WALKS, &c.

---

*The Schedule referred to in these Letters Patent and making part of the same.*

---

TO ALL WHOM IT MAY CONCERN:

Be it known that I, JOHN SEE, of Philadelphia, in the county of Philadelphia, and State of Pennsylvania, have invented an Improved Composition for Covering Roofs, Pavements, and Walks, for Lining Cisterns, Damp Cellars, and Docks, for Plastering Outside Walls, for Making Bricks and Tiles, and for other similar uses; and I do hereby declare that the following is a full and exact description thereof.

The ingredients of this composition are—
Hydraulic cement;
Iron ore, turnings, borings, or filings;
Sand;
Salt.

All of these substances are to be thoroughly pulverized or fine before mixing.

They are mixed together in a dry state. Water is then added till the mass forms a mortar, of the proper consistency to apply with a trowel or otherwise, as desired.

If preferred, the ingredients may be mixed together with water, and not, as above directed, before adding the water.

No definite proportions of the ingredients are necessary. They will properly vary according to the use to which the composition is to be applied; and for any purpose, no exact proportion is essential.

Either of the articles named in the second element of this composition may be used separately, or two or more, or all of them, may be used together.

What I claim as my invention, and desire to secure by Letters Patent, is—

A composition of ingredients herein named, substantially as and for purposes as specified.

JOHN SEE.

Witnesses:
SAM'L P. JONES, Jr.,
JOHN ULRIAN.